: 3,285,761
ABRASION RESISTANT REFRACTORY MATERIAL
Weston Andrew Hare and Walter Edwin Jordan, Wilmington, Del., assignors to E. I. du Pont de Nemours and Company, Wilmington, Del., a corporation of Delaware
No Drawing. Filed June 26, 1964, Ser. No. 378,459
2 Claims. (Cl. 106—59)

The invention is concerned with the preparation of refractroy bodies by thein situ oxidation of aluminum particles.

The firing of aggregates of aluminum particles to alumina-containing refractory structures is taught in Belgian Patent 612,535, granted July 11, 1962. The products of that patent have excellent properties in general. However, some uses require higher levels of one or more properties than that process affords.

The newer methods for making steel are especially demanding on the properties of the refractories used. For example, the lining of the nose cone of the Kaldo furnace is subjected to intense abrasion by the impingement of particles carried by high velocity, high temperature exhaust gases. Heat cast refractories, commonly used in such applications, are quite expensive due to the casting process itself and the cost of cutting the cast slabs to bricks. Also, such products contain large shrinkage holes and are not entirely satisfactory.

One object of this invention is to provide an improved, economical process of making refractory shapes of high abrasion resistance. Other objects will be apparent from the following disclosure.

In accordance with this invention a shaped magnesia refractory is prepared consisting of (A) from about 44 to 78% of fused magnesia refractory grains of about 0.9 to 19 mm. in diameter, essentially void free, and containing (by analysis) a minor amount of a mixture of iron oxide and chromium oxide each present in amounts to at least about 5% of the fused grains and (B) from about 22 to 56% of a porous, substantially homogeneous, bonding phase containing by analysis from about 35 to 65% spinel ($MgO \cdot Al_2O_3$), 0 to 65% magnesia and 0 to 55% (preferably 0 to 15%) $Cr_2O_3$; the bonding phase having a porosity of between about 15 and 40%.

The aforementioned abrasion-resistant refractory body is prepared by mixing (A) from 4 to 15% by weight of aluminum particles, with (B) from 15 to 46% by weight of a filler refractory of about —30 mesh containing (by analysis) at least 25% MgO, the remainder being essentially $Cr_2O_3$, and (C) from 50 to 81% of a fused magnesia refractory in the form of relatively coarse particles containing by analysis at least about 5% of FeO, and at least about 5% of $Cr_2O_3$, the total of such FeO and $Cr_2O_3$ not exceeding 50% of the fused refractory, shaping the mixture and firing the shaped body to oxidize the aluminum at a temperature of at least 600° C.

The preferred products of this invention are characterized by good strength in the cold and at 1550° C., excellent thermal shock resistance, abrasion resistance values of over 300 grams/cm.³, a bulk density of about 2.5 to 3.2 g./cm.³, and a uniform physical structure having well distributed fine pores (e.g., maximum diameters of about 6 mm.). These products comprise by analysis about 8 to 30% $Al_2O_3$, 60 to 87% MgO and 5 to 48% FeO and $Cr_2O_3$ and are especially useful as linings for steel furnaces.

Particles of aluminum or alloys containing major amounts of aluminum are used in the amount of between 4 and 15% of the total weight. The particles may range in size from a powder (e.g., —140 mesh) to pellets or shot having a major dimension as large as 6 mm. (on 3 mesh). Preferably the particles are less than 2 mm. in diameter.

The filler refractory contains at least 25% magnesia with the remainder consisting essentially of chromia ($Cr_2O_3$). This material should pass about a 30-mesh screen. Various mixtures of particle sizes between 30 mesh and finer (e.g., —325 mesh) can be used to insure good packing in the green (unfired) structure. Preferably the magnesia is a high purity (e.g., at least 98% MgO) fused magnesia. Although a purified $Cr_2O_3$ has been used in the examples below, high grade chromia ores may be used.

The fused magnesia refractory is used in a relatively coarse particle size ranging from about 0.1 to 19 mm. in diameter (on 20 mesh). A convenient source is grog prepared by crushing a fused magnesia refractory. Such refractories are made by electrically fusing mixtures of magnesia (e.g., calcined magnesite) and chrome ore. The fines from the crushing can be used as the filler refractory material. Such magnesia refractories will typically contain by analysis 25 to 78% MgO, 5 to 25% FeO, 12 to 50% $Cr_2O_3$, 5 to 25% $Al_2O_3$ and less about 5% each of $SiO_2$, CaO and $Fe_2O_3$.

Electrically fused grains of a major amount of magnesia and containing at least about 5% each of FeO and $Cr_2O_3$ may also be used.

It is postulated that the inclusion of the FeO and $Cr_2O_3$ within the magnesia grain affords the unique bonding observed by this process.

The composition containing aluminum particles, filler refractory and coarse fused magnesia refractory is thoroughly mixed with a liquid to facilitate shaping and preferably with a green binding agent to aid in handling the green shapes. Aqueous systems using water as the shaping liquid and a water-soluble substance as a binding agent are convenient to use. Suitable binders include natural gums such as gum arabic, polysaccharides, polyvinyl alcohol, carboxymethyl cellulose and the like.

An organic liquid can advantageously be used. Combinations such as benzene and tar, chlorinated hydrocarbons and rubber cement, etc., are suitable.

It may be advantageous to add a minor amount (e.g., 1 to 5% of the total dry weight) of a burn-out material such as graphite, wood chips, polystyrene, or other synthetic polymers, and the like. This material should be of relatively fine size (e.g., 10/40 mesh). It permits the use of higher molding pressures and improved contact between the ingredients while still affording a porosity of at least about 20% (required for oxidation of the aluminum) after removal of the burn-out material.

The compositions are shaped by conventional refractory and ceramic techniques such as pressure molding and ramming. Molding pressures of from 1000 to 10,000 p.s.i. (70 to 700 kg./cm.²) have been satisfactorily used to give bulk densities of the dried green product of 2.5 to 3.2 g./cm.³

The molded shapes are dried by conventional methods. The dried shapes are heated in an oxidizing atmosphere such as air, oxygen or mixtures of oxygen and inert gases at a temperature of at least about 600° C. until the aluminum is substantially oxidized. The exact conditions for firing will depend upon the green porosity of the shaped object, the amount of metal present and the temperature. These interactions and variations among them will be apparent to one skilled in the art. To make the best products, the above-mentioned variables should preferably be selected so that a spontaneous and rapid ignition does not take place. Preferably the rate of heating should be controlled so that the temperature of the molded object does not exceed the ambient temperature by more than 100° C. (and more preferably 50° C.). It is preferred to heat at a relatively low temperature initially, until a stress bearing oxide film develops which holds the molded shape of the aggregate during subsequent further oxidation at a higher temperature.

All sieve measurements are made with U.S. Sieve Series.

Flexural strength is measured according to ASTM Standard 1958, Part 4, page 670, Text No. C293–57T, with the use of a span width of 1 to 8 inches.

BLAST ABRASION TEST

A Clemco Dry Blast Cleaning Cabinet (No. Ac2424) with nozzle No. CTS4 (made by Clementina Ltd., of San Francisco) is modified by removing the recirculating grit hose and attaching a constricted hopper above the nozzle to allow about 2000 grams of grit to flow by gravity in 1 minute. The grit used is Norton abrasive alumina grit, 20 mesh, type B (made by Norton Company of Worcester, Mass.).

In conducting the test a weighed and measured sample is placed beneath a rubber mask located in the center of the spray pattern and blasted with a standard hopper charge of grit (2000 g. except for thin sections when 1000 g. is used) from the nozzle by air at 80 p.s.i. (5.6 kg./cm.$^2$). The weight loss of the sample is determined and the volume of sample lost by abrasion is calculated from the original density and the fired weight. The weight of the grit for a standard hopper charge that impinges in the mask area (5.0 x 5.0 cm. or 3.2 x 3.2 cm.) is determined without a sample in place.

The abrasion resistance of a sample is expressed in grams of grit (impinging on sample)/cm.$^3$ of sample lost or g./cm.$^3$ units.

*Example 1*

A molding composition is made of aluminum particles (10.0 parts), fine magnesia as a filler refractory (21.1 parts), chromia as a filler refractory (1.7 parts), a fused magnesia refractory (67.2 parts) and a 33% aqueous solution of gum arabic (5.3 parts).

The composition is molded in a 2.25 inch (5.71 cm.) diameter mold to a 8.1 cm. long cylinder at 2000 p.s.i. (141 kg./cm.$^2$) pressure. The cylinder is dried overnight at room temperature and then in an oven at 50° C. for 24 hours and at 100° C. for 48 hours.

The dried cylinder is fired in an air atmosphere at a steady rate over the temperature ranges indicated below.

25° to 800° C. for 20 hours,
800° to 1200° C. for 8 hours,
1200° to 1400° C. for 4 hours
at 1400° C. for 24 hours,
1400° to 1500° C. for 6 hours,
Cooled over a period of 48 hours.

The fired product (item a) has a bulk density of 2.60 g./cm.$^3$, a flexural strength of 1280 p.s.i. (90 kg./cm.$^2$) and an abrasion resistance of 310 g./cm.$^3$ The aluminum used is a mixture of equal parts of grain ingot, 30/60 mesh (99.6% Al) and deoxidizing shot, 8/28 mesh (99.5% Al).

The fine magnesia is a mixture of 2 magnesias (I and II in a ratio of 4.1/17.0). Magnesia I is an electrically-fused magnesia grain containing about 96.5% MgO of 30/90 mesh. Magnesia II consists of dead-burnt periclase grains of 98% MgO of −200 mesh. The chromia is a commercial chrome green (98% $Cr_2O_3$) of −200 mesh size.

The fused magnesia refractory is made by crushing a heat cast refractory slab containing by analysis 58.7% MgO, 18.5% $Cr_2O_3$, 13.4% FeO, 6.0% $Al_2O_3$, 2.6% $SiO_2$ and 0.8% CaO. The crushed refractory is sized and 2/8 mesh and 8/20 mesh sizes are used in a ratio of 57.6/9.6 respectively.

X-ray analysis of a similar fired product shows periclase (MgO) as the major phase with lesser amounts of spinel and picrochromite (MgO·$Cr_2O_3$) with no free alumina.

The following product (b) is not a part of this invention and is shown for comparative purposes only.

Bricks are shaped from a mixture of aluminum particles, 11.7 parts (the above shot and grain ingot in a ratio of 65/35), fine magnesia, 82.8 parts (magnesias I and II above in a ratio of 60/40, the above chromia, 5.5 parts, and a 33% aqueous solution of gum arabic, 5 parts. The bricks are dried and fired according to the above schedule. The abrasion resistance is only 131 g./cm.$^3$ as contrasted to the value of 310 for a product of this invention.

*Example 2*

This example illustrates the critical nature of the fused magnesia refractory in the process.

Samples are made for compositions corresponding to Items (a), (b) and (c) in Table I following the general procedure of Example 1 and using grain ingot aluminum for all items. The significant difference between the items is in the fused magnesia refractory used.

Items (a) uses the crushed, heat-cast refractory of Example 1 containing FeO and $Cr_2O_3$.

Item (b) uses a refractory made by electrically fusing dead-burnt periclase (98% MgO, 0.9% CaO, 0.2% $Fe_2O_3$, 0.3% $Al_2O_3$ and 0.8% $SiO_2$), crushing the cooled mass and sizing.

Item (c) uses a commercial grade of dead-burnt magnesite (96+% MgO, 1.6% CaO and 1.2% $SiO_2$).

The advantage of using the process of this invention in item (a) over items (b) and (c) is shown in the abrasion resistance values of Table I.

*Example 3*

Various compositions as given in Table I are made from aluminum particles and the filler refractories and fused magnesia refractory of Example 1 using the procedure of that example. The types of aluminum used are as follows.

Item:
(d) Grain ingot 30/60 mesh.
(e) Powder −140 mesh, 99+% Al.
(f) Grain ingot/deoxidizing shot of ca. 1:1.
(g) Grain ingot 30/60 mesh.
(h) Powder −200 mesh, 99.5% Al.

The sizes of the fused magnesia refractory are reported in Table I as "very coarse" (1.9 to 0.48 cm. diameter), "coarse" (2–4/8–10 mesh) and "medium coarse" (8–10/20 mesh).

Four to five parts of a 33% aqueous solution of gum arabic are used in all items except (e) which employs 10 parts of the mixture commercial rubber cement/perchloroethylene in a 2:1 volume ratio.

All items (d)–(h) have good strength, high refractoriness and show the excellent abrasion resistance of the products of this invention. All fired products have bulk densitites in the range 2.57 to 2.81 g./cm.$^3$ The weight grains of the samples upon firing indicate complete oxidation of the aluminum.

TABLE 1

| Item | Aluminum | Filler Refractory | | | Fused Magnesia Refractory | | | Abrasion Resistance, g./cm.³ |
|---|---|---|---|---|---|---|---|---|
| | | Magnesia | | Chromia | Very Coarse | Coarse | Medium Coarse | |
| | | I | II | | | | | |
| a | 15.2 | 19.2 | 12.7 | 2.9 | 50 | | | 230 |
| b | 15.3 | 20.4 | 13.5 | | | 46.0 | 4.5 | 61 |
| c | 15.6 | 15.3 | 13.5 | 5.0 | | 42.9 | 7.6 | 86 |
| d | 10.0 | 4.0 | 17.3 | 1.7 | 45 | 22 | 22 | 465 |
| e | 10.0 | 4.2 | 17.1 | 1.7 | | 57.5 | 9.5 | 495 |
| f | 10.3 | | 17.0 | 1.8 | | 60.1 | 10.1 | 324 |
| g | 6.3 | 15.2 | 10.0 | 1.9 | 44.5 | 22 | 22 | 310 |
| h | 6.2 | 15.0 | 10.0 | 1.9 | | 57.0 | 59.4 | 282 |

What is claimed is:

1. A refractory body consisting essentially of (A) from about 44–78% by weight of fused essentially void-free refractory grains of about 0.9–19 mm. in diameter, said grains comprising by analysis a major amount of MgO and a minor amount of a mixture of iron oxide and chromium oxide, each of said latter oxides being present in an amount constituting at least about 5% by weight of said fused grains, and (B) from about 22–56% of a porous substantially homogeneous bonding phase having a porosity of between about 15 and 40% and containing, by analysis, 35–65% magnesium aluminate spinel, the remainder being constituted by from 0–65% magnesia and 0–55% by weight of chromia.

2. A process for preparing a refractory body comprising mixing (A) from about 4–15% by weight of aluminum particles with (B) from about 15–46% by weight of a filler refractory of about −30 mesh containing at least about 25% MgO by analysis, the remainder being essentially chromia, and (C) from about 50–81% by weight of a fused refractory in the form of relatively coarse particles containing, by analysis, a major amount of MgO and a minor amount of a combination of FeO and $Cr_2O_3$ with each of said latter oxides constituting at least 5% of said fused refractory particles, adding a liquid and a green binding agent, shaping the aforesaid mixture and firing the same to oxidize the aluminum at a temperature of at least about 600° C., the rate of firing being sufficiently gradual that the temperature of the shaped mixture does not exceed the ambient temperature by more than about 100° C.

References Cited by the Examiner

UNITED STATES PATENTS 2,063,543  12/1936  Erdmann _____ 106—62
2,741,822  4/1956  Udy _____ 106—65

TOBIAS E. LEVOW, *Primary Examiner.*

J. E. POER, *Assistant Examiner.*